Sept. 6, 1955     A. SCHUSZLER     2,717,030
ATTACHMENT FOR AUTOMOBILE SEATS
Filed May 4, 1954
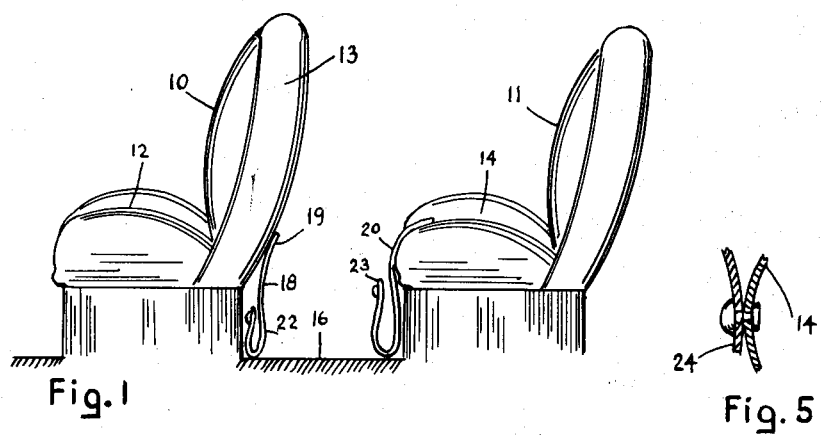
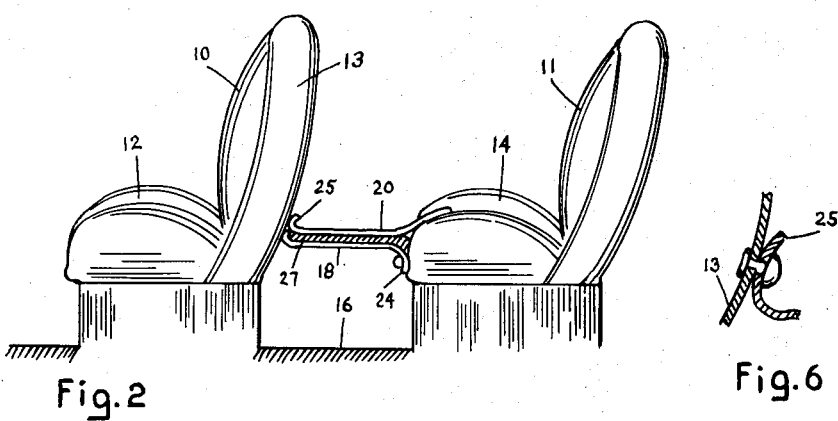
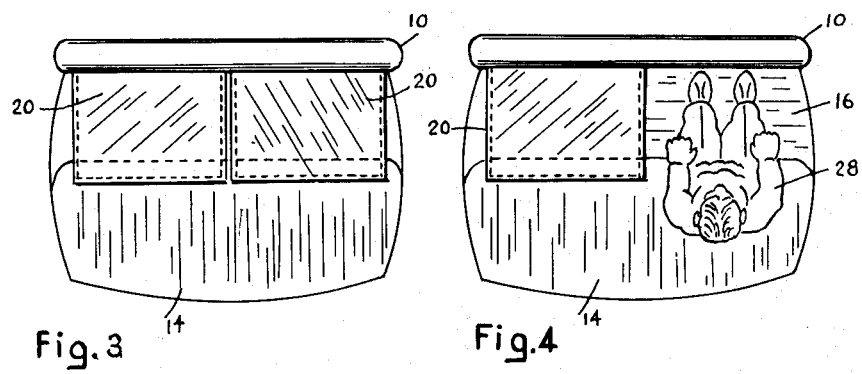
INVENTOR.
ALOYSIUS SCHUSZLER

United States Patent Office 2,717,030
Patented Sept. 6, 1955

2,717,030

ATTACHMENT FOR AUTOMOBILE SEATS

Aloysius Schuszler, Cleveland Heights, Ohio

Application May 4, 1954, Serial No. 427,612

3 Claims. (Cl. 155—188)

The present invention relates to an attachment for automobile seats and it consists in the combinations, constructions and arrangements of parts herein described and claimed.

Generally there is provided as attachment for automobile seats which consists of a pair of flaps affixed to the forward portion of the rear seat of an automobile and a like pair of flaps affixed to the lower portion of back of the front seat of an automobile. Each of the flaps is adapted to be turned up at its lower end and snapped upon itself so as to remain in an out-of-the-way condition when not in use. When desired, however, the flaps on one side of the automobile may be extended and interconnected between the forward and rear seats and a sheet of plywood or the like inserted between the same to thus provide an extension upon which a child can rest, sleep or play. Furthermore, whenever desired, the flaps on both sides of the automobile may be so extended and the entire area, including the rear seat and such extensions, may be used as a play, rest and sleep area for such child or children. When in use, there is provided an extra baggage space beneath such extensions and between the forward and rear seats of the automobile. The plywood or like inserts may be stored in the baggage compartment of the automobile when the same are not in use.

It is accordingly an object of the invention to provide a device of the character set forth which is simple in construction, inexpensive to manufacture and yet effective and efficient in use.

Another object of the invention is to provide a novel seat extension for automobiles or the like.

A further object of the invention is the provision, in a device of the character set forth, of a novel stiffening board forming part of the invention.

Other and further objects of the invention will become apparent from a reading of the following specification taken in conjunction with the drawing, in which:

Figure 1 is a side elevational view of an embodiment of the invention shown in inoperative position, Figure 2 is a view similar to Figure 1 but showing the device of the present invention in operative position, Figure 3 is a plan view illustrating the invention entirely in use, and Figure 4 is a view similar to Figure 3 but showing one side of the device in use while the other side remains in an inoperative condition.

Fig. 5 is an enlarged sectional view of the fastening means connecting the lower flap to the rear seat.

Fig. 6 is an enlarged sectional view of the fastening means connecting the upper flap to the rear of the back of the front seat.

Referring more particularly to the drawing, there is shown therein an automobile having a front seat generally designated at 10 and a rear seat generally designated at 11. The front seat is equipped with a seat portion 12 and a back 13 while the rear seat 11 is likewise equipped with a seat portion 14 and a back 15. Between the front seat 10 and rear seat 11 there is provided the conventional floor 16.

The device comprising the present invention consists of a pair of dependent flaps 18 which are affixed to the lower portion of the rear side of the back, as indicated at 19, and a pair of dependent flaps 20 which are affixed to the forward portion of the upper side of the seat 14, as indicated at 21.

The flaps 18, when not in use, are folded upon themselves and snapped together, as indicated at 22 while the flaps 20 are likewise folded upon themselves and snapped together, as indicated at 23.

When it is desired to use the device, it is only necessary to extend the flap 18 and snap fasten the same, as indicated at 24, to the forward wall of the seat portion 14 located therebehind and to likewise extend the flap 20 to and fasten the same, as indicated at 25, to the rear face of the back 13 of the front seat 10. Thereafter a sheet 27 of plywood or the like is inserted between the flaps 18 and 20. This may be accomplished on both sides of the automobile as indicated in Figure 3 to provide a relatively large play or rest surface or, alternatively, the flaps on but one side of the automobile may be extended and but one side thereof utilized as a play or rest space, as indicated in Figure 4, in which case a person 28 may still utilize the remaining half of the rear seat 11.

While but one form of the invention has been shown and described herein, it will be readily apparent to those skilled in the art that many minor modifications may be made without departing from the spirit of the invention or the scope of the appended claims.

What is claimed is:

1. A device of the character described comprising, in combination with a vehicle having front and rear seats, a pair of dependent flaps affixed to the forward portion of the rear seat, a pair of dependent flaps affixed to the rear of the front seat, and means for connecting the free edges of each of said flaps to the other of the respective seats.

2. A device of the character described comprising, in combination with a vehicle having front and rear seats, a pair of dependent flaps affixed to the forward portion of the rear seat, a pair of dependent flaps affixed to the rear of the front seat, and means for individually connecting the free edges of each of said flaps to the other of the respective seats.

3. A device of the character described comprising, in combination with a vehicle having front and rear seats, a pair of dependent flaps affixed to the forward portion of the rear seat, a pair of dependent flaps affixed to the rear of the front seat, means for individually connecting the free edges of each of said flaps to the other of the respective seats, and a pair of stiffening boards each adapted to be inserted between the flaps on one side of said vehicle when said flaps are so connected at their free ends.

References Cited in the file of this patent

UNITED STATES PATENTS

| | | |
|---|---|---|
| 2,039,682 | Clarke et al. | May 5, 1936 |
| 2,163,198 | Gossard | June 20, 1939 |
| 2,227,180 | Falk | Dec. 31, 1940 |
| 2,253,024 | Farrand | Aug. 19, 1941 |
| 2,645,540 | Trimble et al. | July 14, 1953 |
| 2,688,998 | Erickson et al. | Sept. 14, 1954 |

OTHER REFERENCES

Popular Mechanics Magazine, September 1951, page 189.